United States Patent
Moodie

[11] 3,810,689
[45] May 14, 1974

[54] DEVICE FOR VARYING LIGHT TRANSMISSION EMPLOYING ROLLER-CABLE MECHANISM

[75] Inventor: Donald E. Moodie, Marblehead, Mass.

[73] Assignee: Polaroid Corporation, Cambridge, Mass.

[22] Filed: Oct. 16, 1972

[21] Appl. No.: 297,623

Related U.S. Application Data

[63] Continuation-in-part of Ser. No. 173,838, Aug. 23, 1971, Pat. No. 3,743,381.

[52] U.S. Cl. .............................. 350/159, 74/89.22
[51] Int. Cl. ........................................... G02f 1/16
[58] Field of Search ............... 74/89.22; 254/150 R; 350/159

[56] References Cited
UNITED STATES PATENTS

| 3,281,965 | 11/1966 | Irwin | 350/159 |
| 3,270,705 | 9/1966 | Roeggen | 254/150 R |
| 396,430 | 1/1899 | Reichel | 74/89.22 |
| 2,027,275 | 1/1936 | Foster | 74/89.22 |
| 3,249,337 | 5/1966 | Neumann | 254/150 R |
| 3,403,474 | 10/1968 | Spasoff | 74/89.22 |
| 3,377,118 | 4/1968 | MacNeille | 350/159 |
| 3,491,603 | 1/1970 | Harris | 74/89.22 |

FOREIGN PATENTS OR APPLICATIONS

| 738,102 | 5/1954 | Great Britain | 254/150 R |

OTHER PUBLICATIONS

D. F. Wilkes–Rolamite A New Mechanical Design Concept–Oct. 1967, Pages: 107,124,127,133,134,137,179,180 and 191.

*Primary Examiner*—Samuel Scott
*Assistant Examiner*—Wesley S. Ratliff, Jr.

[57] ABSTRACT

A control device comprising a roller-cable and guiding assembly which minimizes friction. The device includes a pair of rollers mounted in a roller cluster, displaceable along a cable within a guideway. Carried on each roller of the cluster is a free wheeling sleeve roller which is configured for guiding the cable. Actuation and working output structure for such control device are set forth, as for example, a working output structure suitable for operating an arcuately mounted aircraft window.

26 Claims, 15 Drawing Figures

DEVICE FOR VARYING LIGHT TRANSMISSION EMPLOYING ROLLER-CABLE MECHANISM

This is a continuation-in-part of application Ser. No. 173,838, filed Aug. 23, 1971 now Pat. No. 3,743,381.

BACKGROUND OF THE INVENTION

1. Field of the Invention

The present invention relates to roller cluster devices displaceable along a guideway with a view to minimal friction. An application of this invention is concerned with linear movement devices for accomplishing arcuate movement of particular elements, for example, movement of rotatably mounted windows such as aircraft windows, and in further example, movement of rotatably mounted linear polarizing window elements.

2. Description of the Prior Art

One form of such roller cluster principle and structure is known as rolamite. It combines well-known rolling geometry and nearly frictionless bearing capabilities in an assembly comprising roller elements, a resilient band, and a guideway.

The rolamite principle and structures relating thereto are discussed at length in a publication of the Clearinghouse for Federal Scientific and Technical Information, National Bureau of Standards, U.S. Department of Commerce, Springfield, Va. 22151, titled "Rolamite: A New Mechanical Design Concept." The subject is also treated in detail in an instruction manual published by Precision Metals Division, Hamilton Watch Company, Lancaster, Pa. 17604; and in U.S. Pat. No. 3,572,141, issued Mar. 23, 1971 to D. F. Wilkes.

The employment of two optically aligned light polarizing elements, e.g., linear polarizers mounted for relative variation of their polarizing directions to effect variations of light transmission or other optical effects, is well known and extensively covered in the art. As one United States patent relating thereto, see Pat. No. 2,237,566, Edwin H. Land, inventor, issued Apr. 18, 1941.

SUMMARY OF THE INVENTION

This invention is a roller cluster device with structure which makes possible the use of roller-cable systems, providing advantages not available to the "rolamite" roller-band systems.

In applications in which the work load applied to such devices is substantial, strong tension may be required on the roller band, and torsional difficulties may appear for such roller bands in situations exemplified by somewhat imprecise roller or guideway form or assembly, or by overhung load structures. Under such conditions, the roller band has a low fatigue life and tends to buckle, twist, and fray at the edges.

This invention uses roller cable systems instead of such roller band systems, and provides structure uniquely consonant with such cable use. Accordingly, full tensile strength and high fatigue life is readily accomplished.

In such prior art roller cluster systems, using a roller band, the latter lies between the rollers and the guideway roller surfaces as well as between the rollers themselves. Hence, the rollers do not engage each other, nor do they engage the guideway roller surfaces. However, simple substitution of a roller cable for the band provides no lateral support for the cable such that it tends to twist and to creep transversely on the roller surfaces which is not conducive to achievement of the desired minimal friction linear displacement of the roller cluster.

Accordingly, in the subject invention, cable guides formed by circular slots about the peripherals of the rollers are employed. Further, since this arrangement provides a different rolling radius for the portions of the rollers which engage each other and the roller surfaces which contact the cable, as bottomed in the roller guide slots, the latter portion is made free wheeling with respect to the roller body. Hence, in this invention, as set forth in the illustrated embodiment, each roller cluster contains two subassemblies, each containing coaxial rollers. A first roller is in the form of a rigid assembly of two wheels joined by an axle. The periphery of the wheels is the area used for rollable engagement with the roller surfaces of the guideway and for rollable engagement with like peripheries in the first roller of the companion subassembly in the cluster. Also in each such subassembly, a second, sleeve roller is mounted for free rotation on the axle of its respective first roller. The diameter of such sleeve rollers is less than the wheel diameters of the first rollers so as to avoid contact with the guideways, and parallel peripheral slots are formed in each sleeve roller to receive parallel cables of the roller cable system. Hence, while the wheel periphery diameters are greater than the diameter on which the cable is wrapped, the losses caused by rotations of the first and second rollers at different radii, as against the guideway and other rollers versus against the cable, takes the form of minimal frictional rotation of such sleeve rollers on their axle mountings in such subassemblies rather than sliding friction between the cables and the rollers. The latter being particularly detrimental since it not only increases frictional losses but also causes cable wear and increased cable drag with resulting increased cable tension. These, of course, directly reduce the cable life.

The subject invention is further directed to a simple, compact and efficient device for varying the amount of light transmitted through an aperture, such as through the windows of passenger-carrying aircraft. Inasmuch as control of light transmission is to be exercised most conveniently by the occupant of a seat adjacent to the window, it is essential that operation of the device be as simple, trouble free, easy to operate and efficient as possible. These objectives are enhanced by incorporation of a roller-cable assembly in the mechanism. Furthermore, the relatively close linear spacing of the windows in aircraft places emphasis on the requirement for compactness of the device. In the subject invention, this involves a relatively minimum lateral movement of an actuating or control means to obtain a maximum rotational movement or response of a light modifying polarizing element. The latter objective is largely made possible by the incorporation of tackle elements, namely, a pulley integral with a roller component and window cable means extending from the roller component to a peripheral attachment means of the rotatable light polarizing disc.

It is, therefore, a principal object of the present invention to provide an improved roller cluster displacement device.

Another object is to provide such a device in the form of a roller-cable system.

A further object is to provide a multiple roller subassembly which lends itself to grouping of such subassemblies into an improved roller cluster displacement device.

A still further object of the present invention is to provide an improved control device for varying the transmission of light through a window, such as through the windows of passenger-transporting aircraft.

Other objects are to provide a device of the character described embodying the low frictional characteristics and adaptability to combine with tackle means of a roller-cable guideway assembly combination enabling a multiplication of rotational movement of a light polarizing element relative to a given linear movement of the foregoing assembly and tackle means; to provide a device of the type indicated in which are employed two laterally-spaced or tandem sets of roller units, a pair of pulleys one of which is axially aligned and integral with one roller unit of each set, and a pair of window cables, one passing around the pulley of one set and the other passing around the pulley of the other set so as to enable an augmented rotation of the disc; to provide a device of the nature set forth comprising manual actuating means for moving the roller units and pulleys laterally while permitting their unimpeded rotation; to provide devices of the character described of a compactness and so housed as to be adapted in installation inwardly of each window of commercial aircraft; and to provide a device as recited which is capable of providing a control of incident light ranging from extinction to a given maximum transmission thereof.

Other objects of the invention will in part be obvious and will in part appear hereinafter.

BRIEF DESCRIPTION OF THE DRAWINGS

The novel features which are considered characteristic of the invention are set forth with particularity in the appended claims. The invention itself, however, both as to its organization and its method of operation, together with additional objects and advantages thereof will best be understood from the following description of the preferred embodiment when read in connection with the accompanying drawings wherein like numbers have been employed in the different figures to denote the same parts and wherein:

DETAILED DESCRIPTION

Figure 1:
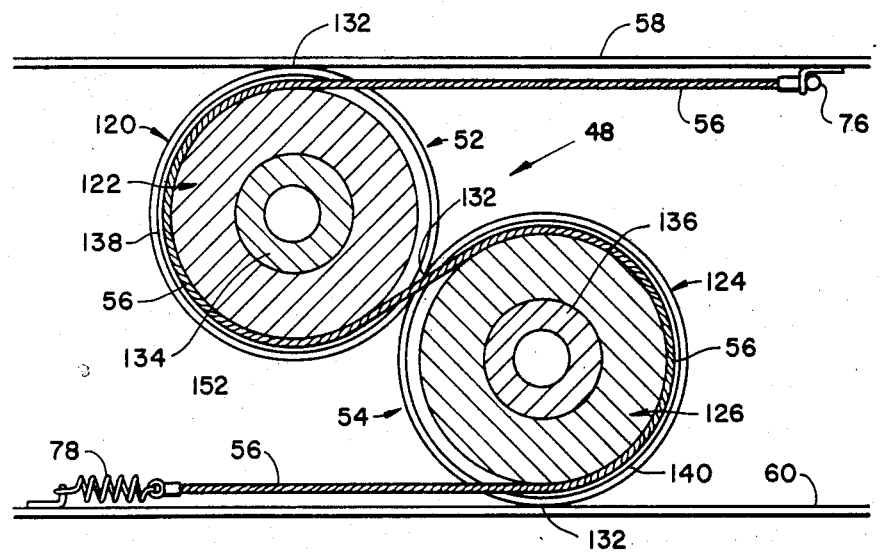
FIG. 1 is a partially schematic illustration of a roller cluster according to this invention, showing sections of roller unit subassemblies, and how a roller cable is disposed about and between such units.

In the illustrated embodiment of FIG. 1, the roller cluster shown at 48 comprises roller units 52 and 54 mounted between guideway faces 58 and 60 with an elongate bias means or roller cable 56 around and between the roller units. Preferably, the cable 56 is one multistrand cable of a generally parallel pair of such cables, each having one end anchored at a stud 76, and the other end secured to a tension spring 78. The disposition of the pair of roller cables 56 is shown in other figures, for example, FIG. 7. The parallel pair of roller cables is used for stability of operational alignment of such roller units.

One or more cables are employed, rather than the conventional flexible band, in order to attain long life under relatively heavy loads. That is, the cables being comprised of many slender filaments are more suited for flexural stresses etc... Hence, the cables provide a multi-strand flexible tensioning means of cylindrical cross section. While many different types of cables will be suitable, of course, it is preferable, as previously indicated to employ a multi-strand cable, for example, a twisted or braided cable having approximately 40 strands of 0.002 inch diameter steel wire or the like is preferred, particularly for the aircraft window embodiment later described in detail.

Figure 2:
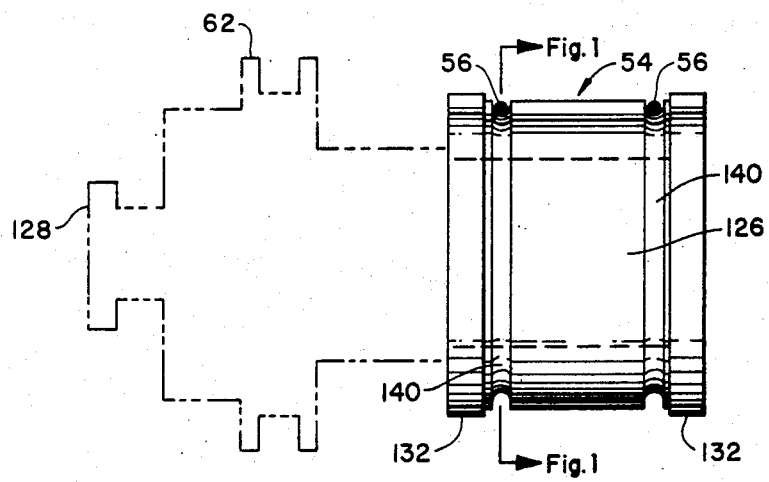
FIG. 2 is a roller face view of one of the roller units; with a phantom line extension to show the addition necessary to create the other roller unit as shown in FIGS. 3, 4, and 5.

In this roller-cable system, each roller unit, 52 and 54, comprises a support roller and a biasing roller. In unit 52, there is an outer, support roller 120 and an inner sleeve roller or biasing roller 122. In unit 54, there is also an outer, support roller 124 and an inner sleeve roller or biasing roller 126. A part of roller unit 52 is essentially identical with the whole of roller unit 54. Thus, in FIG. 2, the full lines illustrate roller unit 54 and the combination of full lines and phantom lines illustrates roller unit 52.

Figure 7:
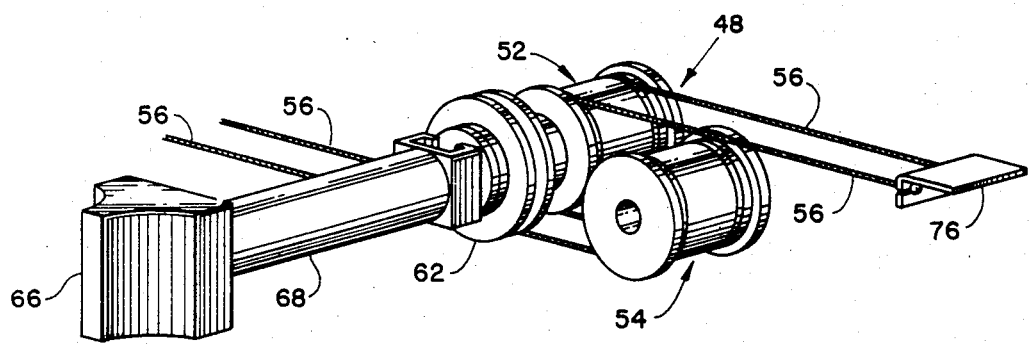
FIG. 7 is a perspective of a roller-cable cluster according to this invention.
Figure 9:
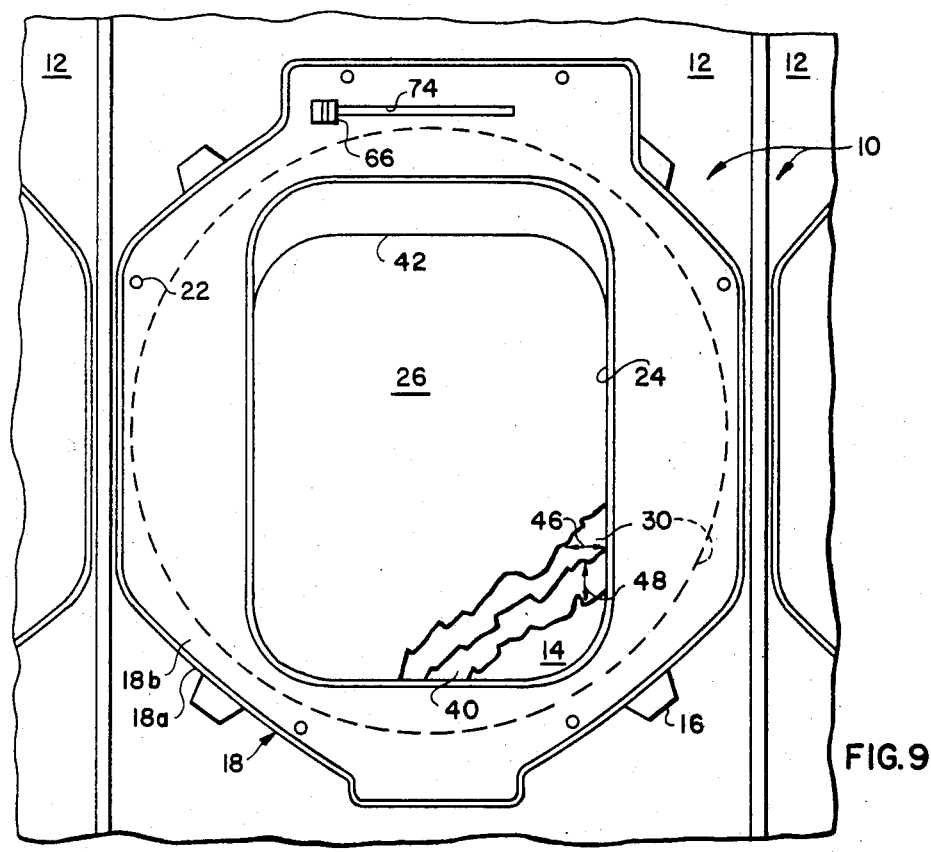
FIG. 9 is a diagrammatic front view, with parts broken away, of the device of the invention mounted in an aircraft.
Figure 10:
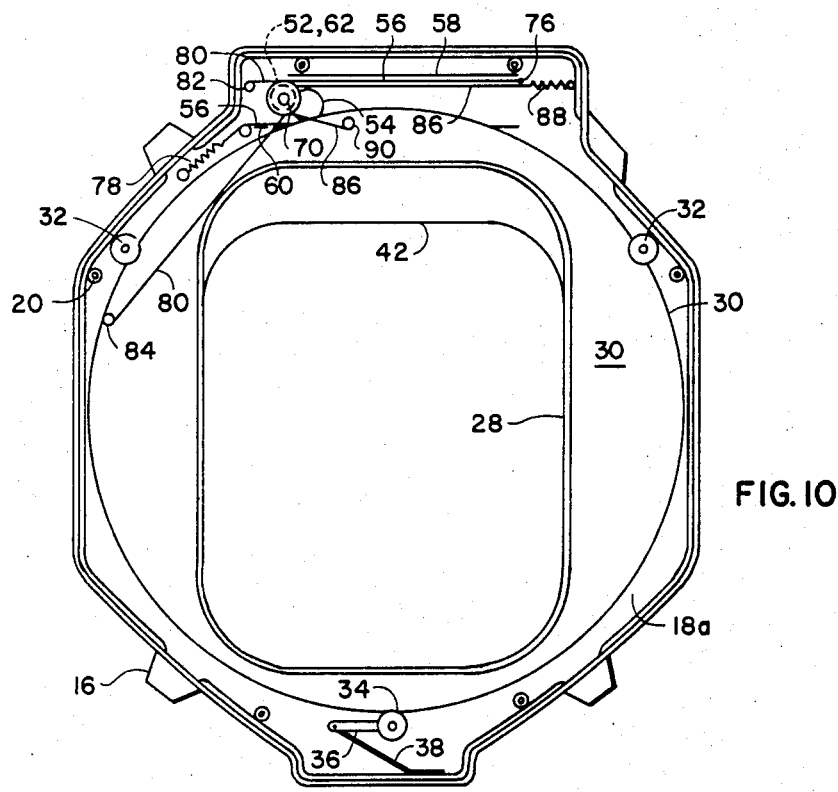
FIG. 10 is a similar view of the device with its front panel removed to show the internal mechanism.

The difference between roller units 52 and 54 lies outside the direct roller-cable function area, and comprises additional structure on roller 120. This additional structure shown in phantom in FIG. 2, as later explained in detail with regard to FIGS. 7, 9 and 10, provides an actuator element 128 through which the roller cluster 48 is moved along the guideway 58, 60 and also provides a working output pulley 62 by means of which window cable may be wound and unwound as the roller cluster 48 is moved along the guideway.

Figure 5:
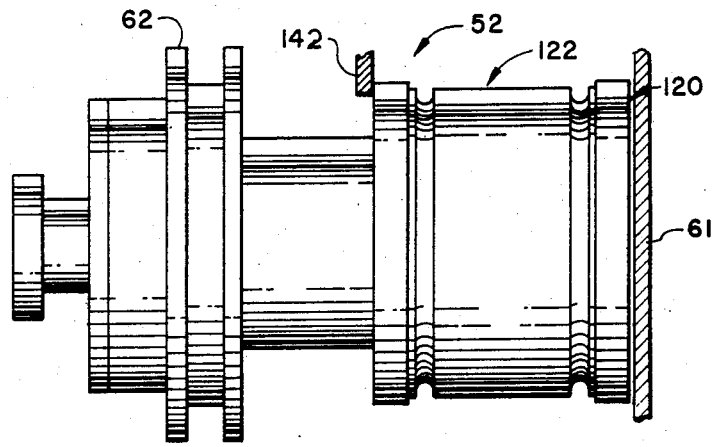

Accordingly, for the moment, and for purposes of explanation of the roller cluster operation, the roller units 52 and 54 of FIG. 1 may be considered to be identical, as in the shown portions. Thus, in FIG. 1, the support rollers 120 and 124 both having outer peripheral surfaces, illustrated at 132 in FIG. 2. These peripheries are of equal radius in both roller units 52 and 54, and as shown in FIG. 1, the sum of the diameters of roller units 52 and 54 as determined by the support roller engagement peripheries 132 is greater than the shortest distance between the parallel guideway roller surfaces 58 and 60. Further, the cable 56, in "S" form about and between the roller units 52 and 54 in engagement with the biasing rollers 122 and 126 provides the rolamite type of roller cluster in that the roller units are biased against each other and against the guideway roller surfaces 58 and 60. It should be noted, however, that in contrast to conventional rolamite units, the biasing cable is not sandwiched between the rollers and the guideway but rather engagement is between the roller unit outer peripheries 132 and the guideway roller surfaces 58 and 60, respectively. Laterally, the roller units 52 and 54 may be contained between a back or side wall 61 of the guideway and an overhanging strip of the front of the guideway, as exemplified by item 142 in FIGS. 5 and 6, respectively.

Figure 4:
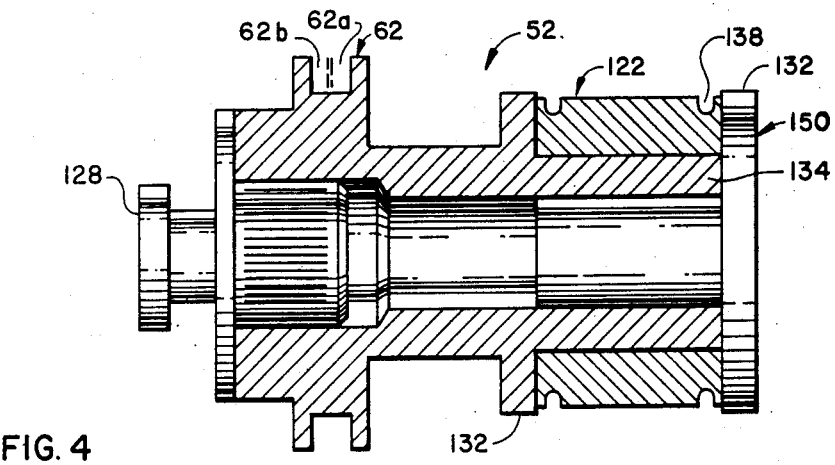
Figure 6:
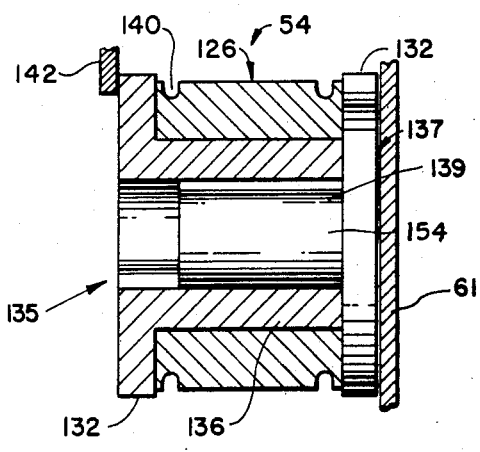
FIG. 6 is a central section of the one roller unit of FIG. 2.
Figure 8:
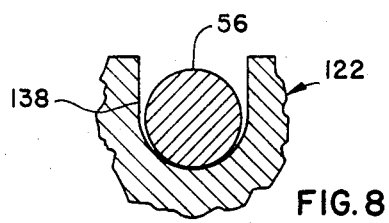
FIG. 8 is a schematic illustration of a roller-cable lying in a roller slot as seen in FIGS. 1-7.

As shown in more detail in FIGS. 4 and 6, each of the roller units 52 and 54 are provided with the above-mentioned sleeve rollers 122 and 126 respectively. These sleeves are rotatably mounted on central shafts 134 and 136 which are operationally a fixed part of the outer rollers 120 and 124, respectively. The sleeves 122 and 126, which are of slightly less diameter than that of the support roller peripheries 132, are provided with peripheral grooves 138 and 140 in which the cables 56 are bottomed. A typical arrangement of the cable is shown in FIG. 8 wherein one of the cables 56 is shown bottomed in one groove 138 of the sleeve 122.

As can be visualized by referring to FIG. 1, the linear displacement of the roller cluster along the guideways and the cables is equal, yet the cables are at a difference, in this embodiment, a smaller turning radius than the roller portions (surfaces 132) which contact the guideways 58 and 60. Hence, where the rollers are to be solely in rolling engagement with each other and the guides, as required for the low rolling friction of the roller-band concept, there must be relative displacement between the cables and the support rollers. Such displacement is provided in a rolling motion by the sleeves 122 and 126 which in this case turn at a slightly faster rate than the outer rollers 120 and 124. Hence, the sleeves provide both means for guiding the cables and means for providing rolling, or that is, low friction relative motion between the cables and the support rollers. Hence, the sleeve mounting accepts the slippage differential between the larger radius operation of the rollers 120 and 124 and the shorter radius operation of the rollers 122 and 126. To this end, the sleeve or biasing rollers 122 and 126 are provided with sufficient end clearance to minimize end friction during their rotation.

Figure 3:
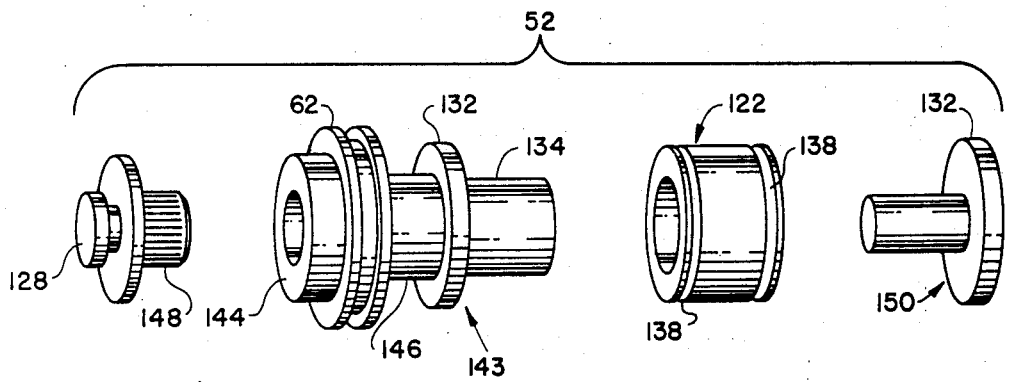
FIGS. 3, 4, and 5 are respectively an exploded view, a central section, and a full face view of the "other" roller unit indicated in FIG. 2.

The roller unit 52, see FIG. 3, comprises a body 143 including the pulley 62, an actuator extension 144, a pulley extension 146, one wheel of the outer roller periphery 132, and the central shaft 134 cooperating with the body 143 is an actuator shaft 148, configured to be force fitted into the actuator extension 144; the sleeve roller 122; and an end cap body 150 which includes the other wheel of the outer roller periphery 132. Included in the end cap is a shaft 151 which is preferably adapted for a light press fit to the hollow central shaft 134 as shown in FIG. 4. Hence, the sleeve 122 is trapped on the shaft 134 by assembly of the end cap 150 to the body 143. Of course, the end cap 150 may also be slip fitted to the shaft 134 since both outer rollers tend to rotate together. In the latter case, the end cap 150 and the body 143 are held together in their assembled form by the guideway side walls.

Referring now to FIG. 6, the roller unit 54 comprises a body 135 including one wheel of the outer roller periphery and a hollow axle shaft 136. Cooperating with the body 135 is the sleeve roller 126 and an end cap 137. The latter, like end cap 150, comprises a shaft 139 which is fitted to axle 136 and carrys the other end wheel forming surface 132.

It should be noted that while the roller cable unit has been illustrated and described as employing centrally located cable sleeves, it should be understood that the cable sleeves could take many different forms. For example, the cable sleeves could be two separate wheels positioned outwardly of the guide contacting surfaces of the roller. The latter would be particularly useful where a single guide passing through the center of the cluster is utilized. It should also be noted that while the sleeve has been described as a sleeve bearing it could be ball bearing mounted on the support roller axle etc.

FIG. 7 shows the roller cluster without the guideway, illustrating the pair of roller cables and the actuator 66 which is mounted for straight line movement while the extension of the pulley 62 rotates in its connection to the actuator.

A variable density window or a light control device 10 of the invention is shown in FIG. 9 in association with portions of similar devices at either side thereof. The variable windows 10 are mounted on the inboard wall 12 of an aircraft, in alignment with a transparent outer windowpane 14 of the aircraft, as by bracket means 16.

Each variable window 10 comprises a housing 18 which includes an outboard (toward the windowpane 14) section 18a, in which mechanism of the invention is mounted, and an inboard or cover section 18b, releasably attached to threaded recesses 20 of section 18a by the screws 22. The housing is of an injection-molded form, preferably composed of a suitable plastic material such, for example, as polycarbonate.

An inboard mounting frame 24 formed in the cover section 18b, having a transparent panel 26 (preferably composed of a plastic sheet material) mounted therein, is aligned with an aperture 28 formed in the outboard section 18a, shown in FIG. 10. As can be seen from the latter figure, a linearly light polarizing disc 30 is peripherally mounted for rotation in a pair of upper guide rollers 32 and a lower guide roller 34. These guide rollers 32 and 34 are rotatably mounted in section 18a and grooved to provide a low-frictional rotational suspension of the disc. The lower roller 34 is mounted on a pivotal arm 36, biased toward the disc 30 by a flat spring 38 bearing against a flat surface of the housing section. This type of mounting accommodates to possible thermal expansion or contraction of the disc 30.

Figure 11:
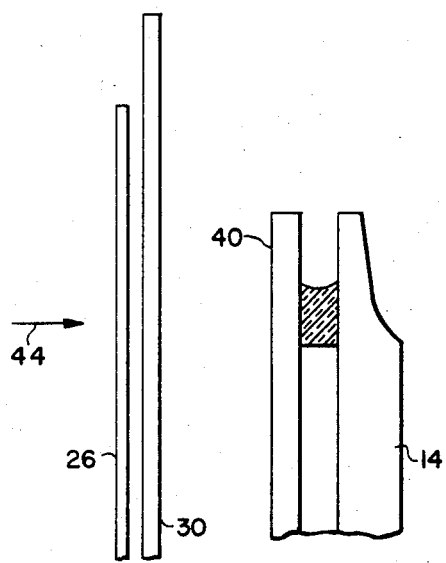
FIG. 11 is a diagrammatic fragmentary side view of light transmitting elements of the invention in relation to an aircraft window.

Mounted in a smaller frame means 42 outboard of and in optical alignment with the polarizing disc 30 is a second linear light polarizer 40. The aircraft window 14 is located outboard of the fixed polarizing panel 40 as is shown more clearly in FIG. 11 wherein the arrow 44 indicates the order of arrangement in a direction from inboard to outboard. As shown in FIG. 9, the mounting frame 42 is to be considered as seen through panel 26 and polarizing disc 30. In FIG. 10, with the cover 18b removed, the aperture 28 and mounting frame 42 are seen through the disc 30.

The double-headed arrows 46 and 48 (FIG. 9) represent invisible polarizing directions or axes within the disc 30 and panel 40, respectively. As illustrated, these directions are crossed at 90°, and, assuming an adequate efficiency of the linear polarizers, substantially no light would be transmitted through the aircraft window into the cabin. When the disc 30 is rotated clockwise from the position of FIG. 10, increasing amounts of light are admitted depending upon the angular relation of internal polarizing axes represented by the arrows 46 and 48, the maximum admittance thereof occurring when a parallel relation of the arrows exists. This would be provided by a 90° clockwise rotation of disc 30.

Rotation of the disc 30 is provided by the previously described roller-cable and tackle mechanism. Hence, the roller units 52 and 54 are mounted above the window in the parallel tracks 58 and 60, respectively which serve to form the guideway. By way of example, with special reference to their adaptation to the present invention, the roller units 52 and 54 are composed of either a steel or a molded plastic such as nylon and may, suitably, be of ⅝ inch outer diameter. The parallel tracks 58 and 60 may be flat and composed of a metal or of an essentially non-deformable plastic such as that of the housing 18. At one end, the roller cables 56 are attached to fixed studs 76 of housing section 18a and, after passing around the roller units 52 and 54, are attached at the other end to coil-type extension springs 78 also attached to section 18a which provides tensioning of the cables.

A slot 74, shown in FIG. 9, permits access to the roller assembly, and an actuating knob 66 is rotationally fastened, as by the integral shaft 68 to an extension 128 of the pulley 62.

As previously explained, linear motion of the roller cluster 48 produces rotary motion of the pulley, the latter in turn is coupled to the polarizer disc 30 by means of a pair of window drive cables 80 and 86, formed, for example, of nylon or braided steel. The first drive cable 80 attached at one end to a fixed stud 82 of the housing section 18a, passes partially around the groove 62a of the pulley 62 identified with roller 52, (see FIG. 4) and is attached at its other end to the periphery of the light polarizing disc 30 by means of a stud 84. The second window cable 86, of a similar material to that of cable 80, is attached at one end to the section 18a by spring means, such as the extension spring 88, passes partially around the groove 62b of the pulley 62, and is attached at its other end to a stud 90 of the light polarizing disc 30 predeterminedly spaced from stud 84.

Figure 13:
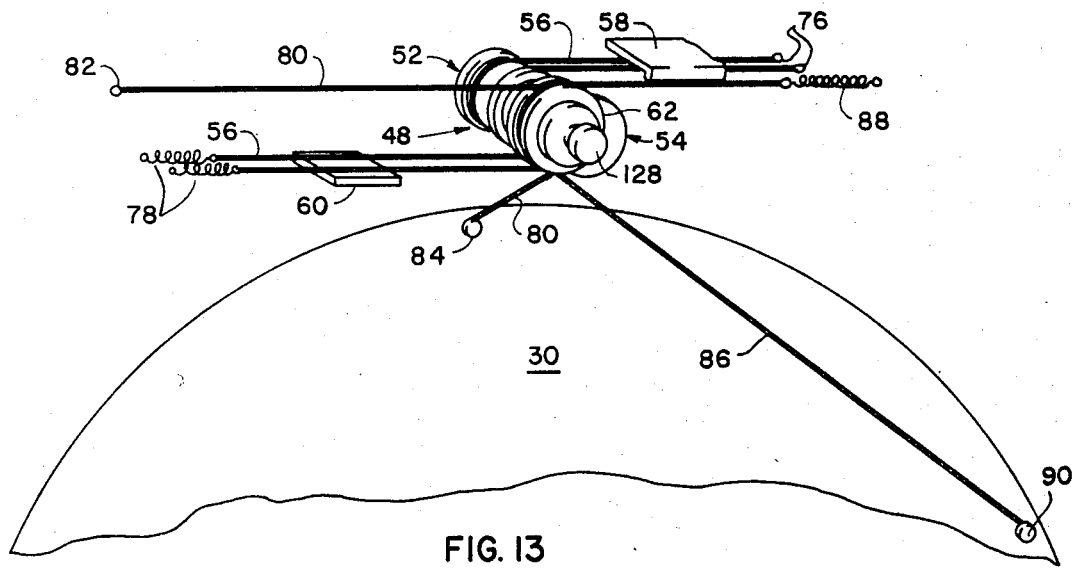
FIG. 13 is a diagrammatic perspective front view illustrating the roller-cable-guideway assembly and tackle mechanism in enlarged detail.

In operation of the window, when the knob 66 and roller units are moved to the right, from the position shown in FIGS. 9 and 10, the window cable 80 has been tautened and the window cable 86 is substantially free from tautening thus producing rotation of the light polarizing disc 30 to the position shown in FIG. 13. This operation produces an approach to parallelism of the polarizing direction 46 (FIG. 9) of the disc 30 with the polarizing direction 48 of the panel 40. A multiplication of the linear movement of the knob 66 and associated roller units 52 and 54 and pulley 62 occurs, in terms of the rotational movement of the disc 30, and more particularly arcuate movement of the attaching means 84 and 90, which, in the example shown is somewhat less than two-to-one. Thus, assuming the disc 30 to have a diameter of 16 inches, and the linear movement of knob 66 to be 5½, a 72 degree rotation of disc 30 is possible. While this degree of rotation does not permit exact parallelism of the polarizing directions 30 and 48, or a maximum transmission of light, visibility through the aircraft window is sufficient for practical purposes.

The multiplication of motion, above described, is provided by the tackle function performed by the pulley 62 and window cables 80 and 86 which produce an augmented arcuate movement of any point on the periphery of the disc 30 relative to linear movement of the pulley. Due to space limitations of an aircraft, the possible lateral movement of the pulley is somewhat curtailed in the example given and, accordingly, rotation of the disc is less than could be produced with an increased lateral movement of the pulley.

The extension spring 88, to which one end of window cable 86 is attached, serves as a "compliance" component. Its compliance function serves to accommodate the differences in the rates at which the cables 80 and 86 pass over the pulley 62. The difference in rate is a function of the angles which the straight portions of cables 80 and 86 make with each other. Accordingly, both window cables are under tension at all times and no slack occurs. A reverse movement of the knob 66 from the extreme right-hand position it would occupy in conjunction with FIG. 13 would produce a counter-clockwise rotation of disc 30.

Figure 12:
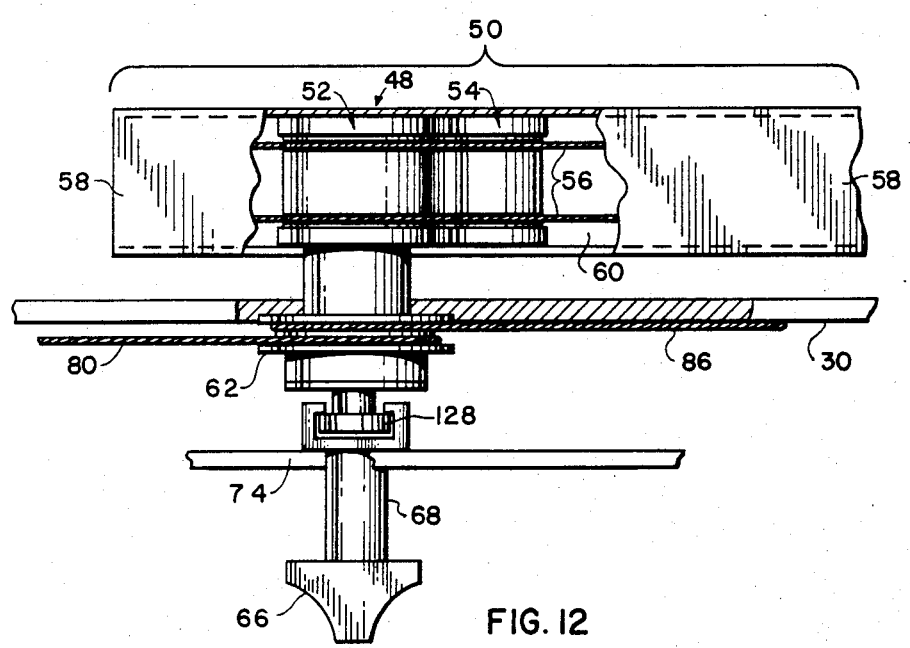
FIG. 12 is a diagrammatic fragmentary top view, partly in section, of the device.
Figure 14:
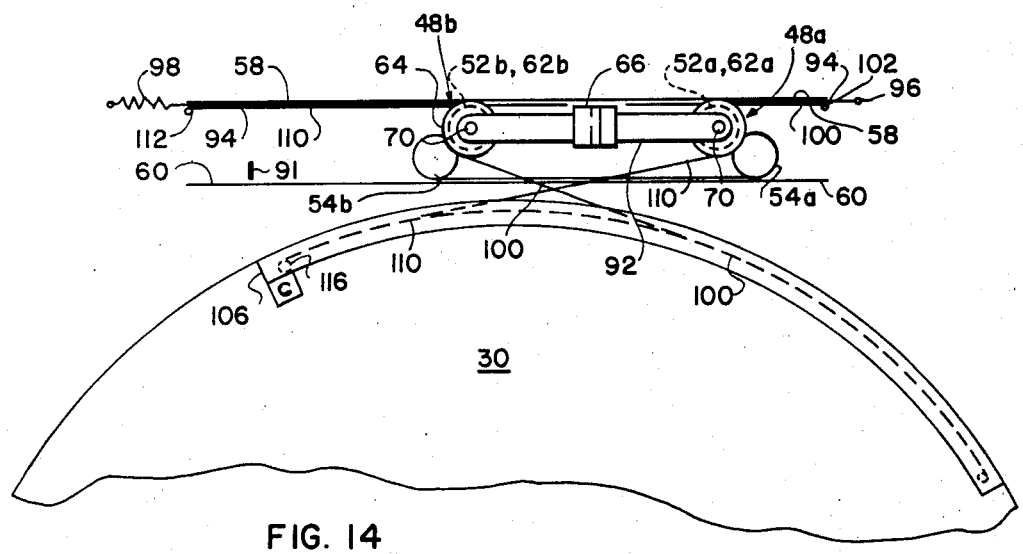
FIG. 14 is a diagrammatic front view of a modification of the roller-cable-guideway assembly and tackle mechanism.
Figure 15:
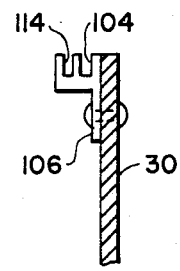
FIG. 15 is a diagrammatic fragmentary sectional view of the window cable guide means of FIG. 14.

A modification of the device of FIGS. 10, 12, and 13 above described, to achieve a full 90° rotation of the disc 30 within the limited linear movement of the knob 66 is shown in FIG. 14. It includes two roller clusters 48a and 48b and pulley combinations 62a and 62b, of the general type previously shown, in a tandem combination whose object is to obtain augmented lengths of pull at the periphery of disc 30 for a linear movement of the control knob 66 which movement need be only slightly greater than that previously described.

In the tandem arrangement, a stub shaft 70 of each roller 52a and 52b of the roller cluster 48a and 48b, respectively is rotationally mounted in a bar element 92. The knob 66 is fixedly attached to the bar element. The roller cables 94 serve a function with respect to both roller unit pairs which is substantially identical to that previously described. In this instance, however, one pair of roller cables 94 passes around both roller clusters 48a and 48b. Hence, the roller cables 94 are fixedly attached to the frame 18a at stud 96, pass in S shape around rollers 52a and 54a, thence, in a reverse S shape around roller units 54b and 52b and to extension springs 98.

For window drive, a first window cable 100 is attached at one end to the fixed stud 102, passes partially unit 62a of roller 52a along the channel 114 of the arcuate guide means 106, and is fastened to the stud 116. The guide 106 follows the perimeter of the disc 30 so as to support the drive cables along this perimeter. Hence, in contrast to the embodiment of FIG. 10, wherein sections of the cables 80 and 86 extend across the polarizing disc 30 as a chord of the circle defined thereby, a section or sections of the cables 100 and 110 in this case extend along a circular path around the rotational axis of the polarizing disc 30.

As in the previously noted embodiment, movement of the knob 66 to the right produces a clockwise rotation of disc 30 and vice-versa. However, it should be noted that the pull-angle of the cables relative to the horizontal at the extremes of right- and left-hand movement of the knob 66 is much less than is the case in FIGS. 10 and 13 and, accordingly, linear movement of the pulleys 62a and 62b provides a greater degree of rotation of disc 30 than is readily possible in the initially described window structure. Assuming a 16½ inches diameter of disc 30 and a 6½ inches movement of the knob 66, a two-to-one multiplication of motion is possible. Thus, the disc 30 can be rotated a full 90°. This permits an augmented range of performance, e.g., from complete extinction to a greater maximum transmission of incident light than was possible in the showing of FIGS. 10 and 13. At all positions of the knob 66, the angle formed by the window cables as they wrap around the pulley remains essentially constant. It will be noted that no extension spring is required to provide cable compliance in the structure of FIG. 14, as the cables will always be in a tautened condition.

It will be understood that the subject invention my be practiced or embodied in other ways without departing from the spirit or character thereof. The preferred embodiments described herein are to be regarded, therefore, as illustrative and not restrictive, the scope thereof being indicated by the appended claims and all variations which come within the meaning of the claims are intended to be embraced therein.

What is claimed is:

1. Apparatus comprising:
    a guideway providing a pair of spaced bearing surfaces;
    a plurality of rollers disposed between said bearing surfaces, said rollers being oriented such that their outer diameters extend between said bearing surfaces, the summation of said outer diameters exceeding the spacing between said bearing surfaces;
    means for urging said rollers towards each other within said guideway, said urging means including elongated biasing means coupled at each end to respective ends of said guideway and passing between the axes of and formed in an S shape around said rollers so as to urge said outer diameters of said rollers into engagement with each other and said spaced bearing surfaces; and
    means displaceably coupled on at least one of said rollers for supporting said biasing means at least partially coaxially with said one roller at a diameter different from the outer diameter of said one roller, said supporting means being displaceable relative to said one roller such that during advancement of said rollers along said guideway said supporting means may be displaced relative to said one roller in compensation for the difference in turning radius of said one roller and said support of said biasing means.

2. The apparatus of claim 1 wherein said supporting means additionally includes means for guiding said biasing means between said roller axes.

3. The apparatus of claim 1 wherein said biasing means is an elongated member coupled at each end to respective ends of said guideway and formed in an S shape around said rollers.

4. The apparatus of claim 1 wherein said biasing means includes a plurality of elongated members.

5. The apparatus of claim 1 wherein said biasing means includes at least one multi-strand cable.

6. The apparatus of claim 1 wherein said supporting means are sleeve members rotatably mounted on each of said rollers, said sleeve members being of smaller outer diameter than said rollers, and said sleeve members including peripheral slot means configured for guiding said biasing means around and between said rollers.

7. The apparatus of calim 6 wherein said slot means is configured to support said biasing means on each of said rollers at a given diameter different than said roller diameter.

8. The apparatus of claim 6 wherein said biasing means includes at least one multistrand cable of given overall thickness, said given diameter is less than said roller diameter by an amount substantially equal to or greater than twice said cable thickness so that said biasing means biases said rollers into rollable engagement with each other and said guideway without compressing said cable against said guideway.

9. Apparatus comprising:
    a guideway providing a pair of spaced bearing surfaces;
    at least one roller cluster mounted between said spaced surfaces for generally linear displacement along a path defined by said guideway, said roller cluster including a pair of roller units, each of said roller units having a first and second roller means configured for rotational motion with respect to each other, said first roller means having outer diameters such that the summation thereof exceeds the spacing of said bearing surfaces, said second roller means of each roller unit having an outer diameter smaller than the outer diameter of its respective first roller means; and
    elongate bias means coupled at each end to respective ends of said guideway and extending at least in part substantially parallel to said guideway, around portions of said second roller means and between said roller units so as to bias said first roller means of each unit into rollable engagement with each other and with said bearing surfaces, said second roller means being configured to support said elongate bias means at a radius different than the outer radius of said second roller means and rotatable with respect thereto thereby permitting different rolling rates of said first rolling means along said guideway and said second rolling means along said bias means as said cluster is translated along said guideway.

10. The apparatus of claim 9 wherein said first and second roller means of each roller unit are coaxially mounted, said second roller means of each unit includes slot means configured to support said elongate bias means at a radius less than the radius of said first roller means and to laterally guide said bias means around each of said roller units.

11. Apparatus according to claim 9, wherein:
    each said second roller means is a sleeve concentrically mounted on reduced radius portions of respective first roller means.

12. Apparatus according to claim 9, wherein:

said elongate bias means is in S form about and between said roller units.

13. Apparatus according to claim 9 wherein said elongate bias means includes at least one multi-strand cable.

14. Apparatus according to claim 9 wherein said elongate bias means comprises a plurality of multi-strand cables.

15. Apparatus according to claim 9 wherein said second roller means have outer diameters less than the outer diameter of their respective first roller means, said bias means includes at least one multistrand cable having a given thickness, and additionally comprising at least one peripheral slot about each of said second roller means as guide means for locating said elongate bias means about and between said roller units, each of said slots being bottomed at a radius less than the radius of said first roller means by an amount at least equal to the thickness of said cable so that said cable is not compressed between said second roller means and said guideway.

16. The apparatus according to claim 9 additionally comprising load coupling means extending from said roller grouping, in the direction of the axes of said rollers.

17. The apparatus according to claim 9 for use with a rotatably mounted aircraft window, said apparatus additionally comprising:
means fixedly extending in an axial direction from one of said first roller means;
pulley means mounted on said extending means; and means affixed to such window and windable on said pulley means as said roller grouping is subject to such displacement to thereby rotate such aircraft window.

18. The apparatus according to claim 9 wherein each of said roller units is a multiple roller assembly with one major radius roller structure in the form of a pair of wheels affixed to an axle extended therebetween, said wheels providing said first roller means, and said assembly including a second, minor radius sleeve roller of smaller radius than that of said wheels rotatably mounted on said axle and providing said second roller means.

19. A roller assembly for use as part of a roller cluster device configured for translational motion along a cable and within a guideway, said roller assembly comprising:
first roller means configured for guideway and roller cluster rollable engagement;
second roller means concentrically rotatably mounted on said first roller means and configured for rollable engagement with such cable means; and
guide means for locating such cable around at least a part of said second roller means.

20. A roller unit according to claim 19 wherein said guide means is a slot formation around the periphery of said second roller means, said slot being bottomed at a radius less than the radius of said first roller means.

21. A pair of roller assemblies each according to claim 20 and both part of such cluster, one of such assemblies additionally comprising:
pulley means as a working output member for said unit, said pulley means being fixedly coupled to said first roller means and axially extended therefrom, and actuator means for displacing such roller cluster device along such guideway.

22. Apparatus comprising a guideway providing a pair of spaced bearing surfaces, a roller grouping mounted between said bearing surfaces for linear displacement along a path defined by said guideway, said roller grouping including a pair of multiple roller units, each of said roller units including equal radius first roller means and second roller means of less radius, said first roller means having diameters totalling more than said spacing between bearing surfaces, elongate bias means extending along said guideway around portions of said second roller means and between said roller units so as to bias said roller means of each unit into rollable engagement with each other and said bearing surfaces, each of said second roller means being formed as a sleeve concentrically mounted on reduced radius portions of respective first roller means, and said second roller means including guide means for locating said bias means about and between said roller units, said guide means being in the form of peripheral slots about each of said second roller means and bottomed at equal radii which is less than the radii of said first roller means.

23. Apparatus according to claim 22 additionally comprising working output means extending from said roller grouping, in the direction of the axes of said rollers, said working output means including pulley means affixed to and axially extending from one of said first roller means, and means windable on said pulley means as said roller grouping is subject to such displacement to rotate an arcuately mounted window.

24. Apparatus comprising:
a first light polarizing element;
a second light polarizing element juxtaposed with respect to said first light polarizing element; and
means for effecting relative rotational motion between said polarizing elements whereby the light transmitting characteristic of said polarizing elements in combination may be varied, said means including an actuator member in the form of a roller-cable assembly mounted for displacement along a linear path and connected to at least one of said polarizer elements, said roller-cable assembly including a pair of roller units each having a first roller means configured for rolling engagement with said guideway and a second roller means configured for engagement with said cable, and said first and second roller means of each roller unit being displaceable with respect to each other so as to permit differential motion of each of said first and said second roller means during said translation of said roller-cable assembly.

25. A control device for providing a variable transmission of light passing through an aperture such as through the windows of aircraft, said device comprising:
an assembly including at least one pair of rollers with a flexible roller-cable wrapped around portions of said rollers in an S configuration and means providing a pair of spaced bearing surfaces constituting a guideway between and toward which rollers are positioned and biased, said roller-cable assembly including a pair of roller units each having a first roller means configured for rolling engagement with said guideway and a second roller means configured for engagement with said cable, and said first and second roller means of each roller unit being displaceable with respect to each other so as to permit differential motion of each of said means during said translation of said roller-cable assembly.

26. A control device as defined in claim 25 wherein said actuating means is a manually movable knob to which said pulley is rotationally connected.

* * * * *